(12) United States Patent
Zhou (10) Patent No.: US 12,115,986 B2
(45) Date of Patent: Oct. 15, 2024

(54) VEHICLE SPEED CONTROL METHOD, APPARATUS AND DEVICE

(71) Applicant: QUECLINK WIRELESS SOLUTIONS CO., LTD., Shanghai (CN)

(72) Inventor: Xiang Zhou, Shanghai (CN)

(73) Assignee: QUECLINK WIRELESS SOLUTIONS CO., LTD., Shanghai (CN)

( * ) Notice: Subject to any disclaimer, the term of this patent is extended or adjusted under 35 U.S.C. 154(b) by 217 days.

(21) Appl. No.: 17/845,886

(22) Filed: Jun. 21, 2022

(65) Prior Publication Data

US 2022/0314988 A1    Oct. 6, 2022

Related U.S. Application Data

(63) Continuation of application No. PCT/CN2020/140372, filed on Dec. 28, 2020.

(30) Foreign Application Priority Data

Dec. 30, 2019   (CN) .......................... 201911403287.1

(51) Int. Cl.
  *B60W 30/14*  (2006.01)
  *B60K 31/00*  (2006.01)
  (Continued)

(52) U.S. Cl.
  CPC ....... *B60W 30/146* (2013.01); *B60K 31/0058* (2013.01); *H04W 4/021* (2013.01);
  (Continued)

(58) Field of Classification Search
  CPC .......... B60W 30/146; B60W 2555/60; B60W 2556/45; B60K 31/0058; B60K 31/00;
  (Continued)

(56) References Cited

U.S. PATENT DOCUMENTS 6,008,740 A    12/1999  Hopkins
9,581,461 B1 *  2/2017  Chintakindi ......... G08G 1/0129
(Continued)

FOREIGN PATENT DOCUMENTS

CN    101807341 A    8/2010
CN    202071696 U    12/2011
(Continued)

OTHER PUBLICATIONS

International Search Report for PCT/CN2020/140372.
(Continued)

*Primary Examiner* — Hai H Huynh
(74) *Attorney, Agent, or Firm* — J.C. PATENTS (57) ABSTRACT

A vehicle speed control method, an apparatus, a device and a storage medium applied to a vehicle. The method includes: receiving (S210) a speed limit command sent by a speed control device, where the speed limit command includes a speed limit, and the speed limit command is generated by the speed control device when it is determined a position of the vehicle is in an area where an accident occurrence rate is greater than or equal to a preset threshold; reducing (S220) a travelling speed of the vehicle to less than the speed limit in response to the speed limit command. According to the vehicle speed control method, vehicle speed can be controlled according to actual safety situation on a road, thereby improving safety of vehicle travelling.

16 Claims, 7 Drawing Sheets

(51) Int. Cl.
*H04W 4/02* (2018.01)
*H04W 4/021* (2018.01)
*H04W 4/44* (2018.01)
*H04W 64/00* (2009.01)

(52) U.S. Cl.
CPC ............ *H04W 4/023* (2013.01); *H04W 4/44* (2018.02); *H04W 64/003* (2013.01); *H04W 64/006* (2013.01); *B60K 2031/0091* (2013.01); *B60W 2555/60* (2020.02); *B60W 2556/45* (2020.02)

(58) Field of Classification Search
CPC .......... B60K 2031/0091; H04W 4/021; H04W 4/023; H04W 4/44; H04W 64/003; H04W 64/006; G08G 1/0141; G08G 1/096725; G08G 1/096758; G08G 1/096783; G08G 1/0116
USPC ........ 701/58, 59, 60, 67, 68, 70, 71, 72, 93, 701/94, 96
See application file for complete search history.

(56) References Cited

U.S. PATENT DOCUMENTS

| | | | |
|---|---|---|---|
| 10,019,009 B2 * | 7/2018 | Chintakindi | B60W 60/0055 |
| 10,576,979 B2 * | 3/2020 | Knoller | B60W 50/14 |
| 11,726,437 B2 * | 8/2023 | Chintakindi | B60Q 9/00 701/23 |
| 2002/0189591 A1 | 12/2002 | Easton | |
| 2009/0243883 A1 | 10/2009 | Simon | |
| 2010/0332100 A1 | 12/2010 | Faggetter | |
| 2015/0149059 A1 * | 5/2015 | Choi | B60W 30/146 701/96 |
| 2016/0086285 A1 * | 3/2016 | Jordan Peters | G08G 1/096827 701/484 |

FOREIGN PATENT DOCUMENTS

| | | |
|---|---|---|
| CN | 203142407 U | 8/2013 |
| CN | 103538478 A | 1/2014 |
| CN | 103818258 A | 5/2014 |
| CN | 104553796 A | 4/2015 |
| CN | 104670231 A | 6/2015 |
| CN | 105584366 A | 5/2016 |
| CN | 105761535 A | 7/2016 |
| CN | 106056927 A | 10/2016 |
| CN | 107139723 A | 9/2017 |
| CN | 207291678 U | 5/2018 |
| CN | 108688467 A | 10/2018 |
| CN | 109130854 A | 1/2019 |
| CN | 109664762 A | 4/2019 |
| CN | 111114317 A | 5/2020 |
| EP | 3370036 A1 | 9/2018 |
| JP | 2019008411 A | 1/2019 |

OTHER PUBLICATIONS

First Office Action of the priority application CN201911403287.1.
Second Office Action of the priority application CN201911403287.1.
Third Office Action of the priority application CN201911403287.1.
Notice of Allowance of the priority application CN201911403287.1.
Extended European Search Report of the parallel application EP20911055.0.
First Office Action of the parallel application EP20911055.0.

* cited by examiner

FIG. 1

| Receiving a speed limit command sent by a speed control device, where the speed limit command includes a speed limit, and the speed limit command is generated by the speed control device when it is determined that a position of the vehicle is in an area where an accident occurrence rate is greater than or equal to a preset threshold | ─ S210 |

| Reducing a travelling speed of the vehicle to less than the speed limit in response to the speed limit command | ─ S220 |

VEHICLE SPEED CONTROL METHOD, APPARATUS AND DEVICE

CROSS-REFERENCE TO RELATED APPLICATIONS

This application is a continuation of international application No. PCT/CN2020/140372, filed on Dec. 28, 2020, which claims priority to Chinese Patent Application No. 201911403287.1, filed on Dec. 30, 2019. Both of the above applications are hereby incorporated by reference in their entireties.

TECHNICAL FIELD

The present disclosure relates to the field of Vehicles to Everything technology and, in particular, to a vehicle speed control method, an apparatus and a device.

BACKGROUND

With improvement of people's living standards, more and more people are driving, and traffic accidents are increasing. How to reduce occurrence of traffic accidents and improve safety of vehicle travelling has become a focus of attention.

In a technical solution, a driver obtains speed limit information of the current road through a cell phone navigation apparatus or a vehicle navigation apparatus, and the driver controls vehicle speed according to the obtained speed limit information. However, in this technical solution, the speed limit information given by the navigation device is a speed limit prescribed by traffic laws and regulations, which makes it difficult to effectively control the vehicle speed according to actual safety situation of the road and to effectively improve the safety of vehicle travelling.

Therefore, how to control the vehicle speed according to the actual safety situation of the road and improve the safety of vehicle travelling has become an urgent technical problem to be solved.

SUMMARY

Embodiments of the present disclosure provide a vehicle speed control method, an apparatus, a device and a storage medium for solving the problem of how to control vehicle speed according to actual safety situation of a road and improve safety of vehicle travelling.

A first aspect of the embodiments of the present disclosure provides a vehicle speed control method applied to a vehicle. The method includes: receiving a speed limit command sent by a speed control device, where the speed limit command includes a speed limit, and the speed limit command is generated by the speed control device when it is determined that a position of the vehicle is in an area where an accident occurrence rate is greater than or equal to a preset threshold; and reducing a travelling speed of the vehicle to less than the speed limit in response to the speed limit command.

In some embodiments of the present disclosure, based on the above solution, the speed control device is disposed in the area where the accident occurrence rate is greater than or equal to the preset threshold.

In some embodiments of the present disclosure, based on the above solutions, the method further includes: determining a cellular network cell in which the vehicle is located; determining whether the speed control device is present in the cellular network cell; and if present, establishing a communication connection between the vehicle and the speed control device through a Subscriber Identity Module (SIM) card configured on the vehicle, where the SIM card is a cellular network-based SIM card.

In some embodiments of the present disclosure, based on the above solutions, establishing the communication connection between the vehicle and the speed control device includes: if there are a plurality of speed control devices in the cellular network cell, determining a distance between the vehicle and each of the speed control devices; determining a target speed control device from the plurality of the speed control devices based on the distance between the vehicle and each of the speed control devices; and establishing a communication connection between the vehicle and the target speed control device.

In some embodiments of the present disclosure, based on the above solutions, determining the distance between the vehicle and each of the speed control devices includes: determining current latitude and longitude of the vehicle and current latitude and longitude of each of the speed control devices; determining the distance between the vehicle and each of the speed control devices based on the current latitude and longitude of the vehicle and the current latitude and longitude of each of the speed control devices.

In some embodiments of the present disclosure, based on the above solutions, a speed control command receiving device is installed on the vehicle, and receiving the speed limit command sent by the speed control device includes: receiving, through the speed control command receiving device, the speed limit command sent by the speed control device via a fifth-generation cellular network.

In some embodiments of the present disclosure, based on the above solutions, a vehicle speed limiting device is installed on the vehicle, and the method further includes: if a current travelling speed is less than or equal to the speed limit, not activating the vehicle speed limiting device; and reducing the travelling speed of the vehicle to less than the speed limit includes: reducing the travelling speed of the vehicle to less than the speed limit through the vehicle speed limiting device.

A second aspect of the embodiments of the present disclosure provides a vehicle speed control method applied to a speed control device. The method includes: listening to whether a vehicle enters a target area, where the target area is an area where an accident occurrence rate is greater than a preset threshold; and if a vehicle enters, sending a speed limit command to the vehicle, where the speed limit command includes a speed limit, and the speed limit command is used to control a travelling speed of the vehicle to be less than the speed limit.

In some embodiments of the present disclosure, based on the above solution, listening to whether a vehicle enters the target area includes: monitoring whether a vehicle enters a cellular network cell in which the speed control device is located; and if a vehicle enters, establishing a communication connection between the speed control device and the vehicle through a SIM card installed on the speed control device, where the SIM card is a SIM card based on the cellular network.

A third aspect of the embodiments of the present disclosure provides a vehicle speed control apparatus applied to a vehicle. The apparatus includes: a receiving module, configured to receive a speed limit command sent by a speed control device, where the speed limit command includes a speed limit, and the speed limit command is generated by the speed control device when it is determined that a position of the vehicle is in an area where an accident occurrence rate is greater than or equal to a preset threshold; a speed control module, configured to reduce a travelling speed of the vehicle to less than the speed limit in response to the speed limit command.

In some embodiments of the present disclosure, based on the above solution, the speed control device is disposed in the area where the accident occurrence rate is greater than or equal to the preset threshold.

In some embodiments of the present disclosure, based on the above solutions, the apparatus further includes: a cell determination module, configured to determine a cellular network cell in which the vehicle is located; a speed control device determination module, configured to determine whether the speed control device is present in the cellular network cell; and a communication connection establishment module, configured to: if present, establish a communication connection between the vehicle and the speed control device through a SIM card configured on the vehicle, where the SIM card is a cellular network-based SIM card.

In some embodiments of the present disclosure, based on the above solutions, the communication connection establishment module includes: a distance determination unit, configured to: if there are a plurality of speed control devices in the cellular network cell, determine a distance between the vehicle and each of the speed control devices; a target device determination unit, configured to determine a target speed control device from the plurality of the speed control devices based on the distance between the vehicle and each of the speed control devices; and a connection establishment unit, configured to establish a communication connection between the vehicle and the target speed control device.

In some embodiments of the present disclosure, based on the above solutions, the distance determination unit is configured to: determine current latitude and longitude of the vehicle and current latitude and longitude of each of the speed control devices; and determine a distance between the vehicle and each of the speed control devices based on the current latitude and longitude of the vehicle and the current latitude and longitude of each of the speed control devices.

In some embodiments of the present disclosure, based on the above solutions, a speed control command receiving device is installed on the vehicle, and the receiving module is configured to: receive, through the speed control command receiving device, the speed limit command sent by the speed control device via a cellular network.

In some embodiments of the present disclosure, based on the above solutions, a vehicle speed limiting device is installed on the vehicle, and the vehicle speed limiting device is configured to: if a current travelling speed is less than or equal to the limited speed, not active the vehicle speed limiting device; and that the speed control module is configured to reduce the travelling speed of the vehicle to less than the speed limit in response to the speed limit command includes that: the speed control module is configured to reduce the travelling speed of the vehicle to less than the speed limit through the vehicle speed limiting device.

A fourth aspect of the embodiments of the present disclosure provides a vehicle speed control apparatus applied to a speed control device. The apparatus includes: a listening module, configured to listen to whether a vehicle enters a target area, where the target area is an area where an accident occurrence rate is greater than a preset threshold; and a speed limit command sending module, configured to: if a vehicle enters, send a speed limit command to the vehicle, where the speed limit command includes a speed limit, and the speed limit command is used to control a travelling speed of the vehicle to be less than the speed limit.

In some embodiments of the present disclosure, based on the above solution, the listening module includes: a monitoring module, configured to monitor whether a vehicle enters a cellular network cell in which the speed control device is located; and a connection establishment module, configured to: if a vehicle enters, establish a communication connection between the speed control device and the vehicle through a SIM card installed on the speed control device, where the SIM card is a cellular network-based SIM card.

A fifth aspect of the embodiments of the present disclosure provides a vehicle speed control device, including: a receiver, a processor, a memory and a transmitter; where the memory is configured to store a computer program and data, and the processor calls the computer program stored in the memory to execute the vehicle speed control method provided in any of the embodiments of the first aspect.

A sixth aspect of the embodiments of the present disclosure provides a vehicle speed control device, including: a receiver, a processor, a memory and a transmitter; where the memory is configured to store a computer program and data, and the processor calls the computer program stored in the memory to execute the vehicle speed control method provided by any of the embodiments of the second aspect.

A seventh aspect of the embodiments of the present disclosure provides a computer-readable storage medium. The computer-readable storage medium includes a computer program, and the computer program is used to execute the vehicle speed control method provided by any of the embodiments of the first aspect when executed by a processor.

An eighth aspect of the embodiments of the present disclosure provides a computer-readable storage medium. The computer-readable storage medium includes a computer program, and the computer program is used to execute the vehicle speed control method provided by any of the embodiments of the second aspect when executed by a processor.

According to the vehicle speed control method, apparatus, device and storage medium provided by the embodiments of the present disclosure, when the vehicle travels to an accident-prone place, that is, an area where the accident occurrence rate is greater than or equal to the preset threshold, the speed limit command is sent to the vehicle, and the travelling speed of the vehicle is reduced to below the speed limit according to the speed limit command. As actual safety situation of a road is fully considered, vehicle speed can be controlled according to the actual safety situation on the road, thereby improving safety of vehicle travelling.

BRIEF DESCRIPTION OF DRAWINGS

In order to more clearly illustrate the technical solutions in embodiments of the present disclosure or in the prior art, the following is a brief description of the drawings required in the description of the embodiments or the prior art. It is obvious that the drawings in the following description are some embodiments of the present disclosure, and that other drawings can be obtained by those of ordinary skill in the art on the basis of these drawings without any creative efforts.

DESCRIPTION OF EMBODIMENTS

In order to make the objectives, technical solutions and advantages of embodiments of the present disclosure clearer, in the following, the technical solutions in the embodiments of the present disclosure will be clearly and comprehensively described with reference to the drawings in the embodiments of the present disclosure. Obviously, the described embodiments are merely a part of embodiments of the present disclosure, not all of them. All other embodiments obtained by those of ordinary skill in the art on the basis of the described embodiments without creative efforts shall fall within the protection scope of the present disclosure.

Most of the existing vehicle speed control solutions provide real-time speed limit information through a navigation apparatus, and drivers control vehicle speed according to the real-time speed limit information. However, in such technical solutions, the speed limit information given by the navigation apparatus is a speed limit prescribed by traffic laws and regulations, which makes it difficult to effectively control the vehicle speed according to actual safety situation of a road and to effectively improve safety of vehicle travelling.

Based on the above content, the basic concept of the present disclosure is to statistically determine the position of occurrence of traffic accidents in a predetermined time period, such as a year, determine an area where an accident occurrence rate is greater than or equal to a preset threshold as an accident-prone place, and when a vehicle travels to the accident-prone place, i.e., the area where the accident occurrence rate is greater than or equal to the preset threshold, send a speed limit command to the vehicle to reduce a travelling speed of the vehicle to be below a speed limit according to the speed limit command. According to the technical solutions of the embodiments of the present disclosure, actual safety situation of a road is fully considered, and vehicle speed can be controlled according to the actual safety situation on the road, thereby improving safety of vehicle travelling.

Figure 1:
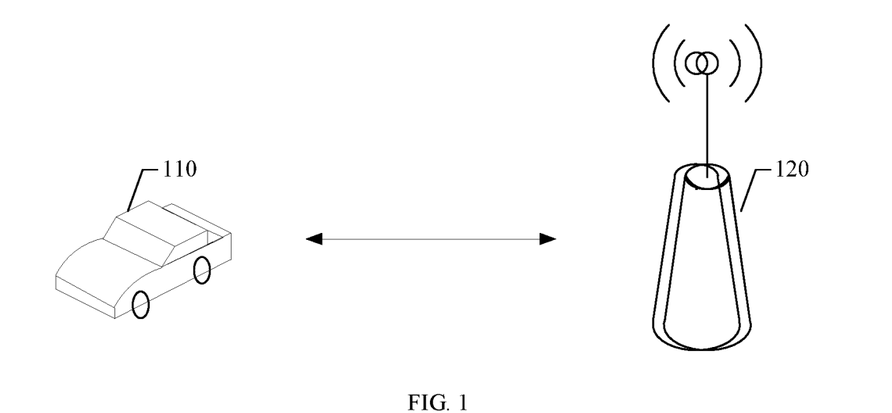
FIG. 1 is a schematic diagram of an application scenario of a vehicle speed control method provided according to some embodiments of the present disclosure.

FIG. 1 is a schematic diagram of an application scenario of a vehicle speed control method provided according to some embodiments of the present disclosure. Referring to FIG. 1, the application scenario includes a vehicle 110 and a speed control device 120. The speed control device 120 is installed in an area where an accident occurrence rate is greater than or equal to a preset threshold. When a position of the vehicle 110 is in the area where the accident occurrence rate is greater than or equal to the preset threshold, for example, when the vehicle 110 and the speed control device 120 are under a same cellular network, a command sending device on the speed control device 120 sends a speed limit command to the vehicle 110, and the speed limit command includes a speed limit. After receiving the speed limit command, the vehicle 110 compares a current travelling speed of the vehicle with the speed limit, and if the current travelling speed is greater than the speed limit, then the travelling speed of the vehicle is reduced to less than the speed limit.

It should be noted that in the example application scenario of FIG. 1, the speed control device 120 is disposed outside of the vehicle 110, and although only one speed control device is shown, the number of speed control devices 120 in the embodiments of the present disclosure is not limited to one, and a plurality of speed control devices may also be included, which is also within the protection scope of the present disclosure.

The following describes a vehicle speed control method according to exemplary embodiments of the present disclosure with reference to the drawings in conjunction with the application scenario of FIG. 1. It should be noted that the above application scenario is shown only to facilitate understanding of the spirit and principles of the present disclosure, and the embodiments of the present disclosure are not limited in any way in this respect. On the contrary, the embodiments of the present disclosure can be applied to any applicable scenarios.

Figure 2:
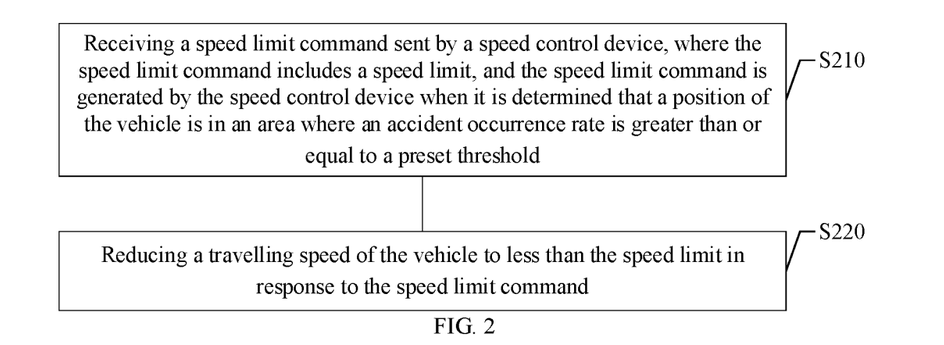
FIG. 2 is a schematic flowchart of a vehicle speed control method provided according to some embodiments of the present disclosure.

FIG. 2 is a schematic flowchart of a vehicle speed control method provided according to some embodiments of the present disclosure. The vehicle speed control method includes steps S210 and S220 and can be applied to the vehicle 110 of FIG. 1. The vehicle speed control method in an exemplary embodiment is described in detail below in conjunction with FIG. 2.

Referring to FIG. 2, in step S210, receiving a speed limit command sent by a speed control device, where the speed limit command includes a speed limit, and the speed limit command is generated by the speed control device when it is determined that a position of the vehicle is in an area where an accident occurrence rate is greater than or equal to a preset threshold.

In the exemplary embodiment, when the position of the vehicle enters the area where the accident occurrence rate is greater than or equal to the preset threshold, such as entering a cellular cell where the speed control device is located, the speed control device generates the speed limit command and send the speed limit command to the vehicle, the speed limit command including the speed limit. The preset threshold may be determined according to the number of accidents that occurred at the position of the area in the previous year.

In step S220, reducing a travelling speed of the vehicle to less than the speed limit in response to the speed limit command.

In the exemplary embodiment, after receiving the speed limit command sent by the speed control device, a current travelling speed of the vehicle is obtained and the current travelling speed of the vehicle is compared to the speed limit in the speed limit command. For example, the current travelling speed of the vehicle is obtained by a speedometer, and the obtained current travelling speed of the vehicle is compared with the speed limit in the speed limit command.

Further, if the current travelling speed of the vehicle is greater than the speed limit in the speed limit command, then the travelling speed of the vehicle is reduced to less than the speed limit. For example, if the speed limit is 60 km/h and the current travelling speed of the vehicle is 80 km/h, then the current travelling speed of the vehicle is reduced to below 60 km/h.

According to the technical solution in the exemplary embodiment of FIG. 2, when the vehicle travels to an accident-prone place, i.e., the area where the accident occurrence rate is greater than or equal to the preset threshold, the speed limit command is sent to the vehicle, and the travelling speed of the vehicle is reduced below the speed limit according to the speed limit command. Since actual safety situation of a road is fully considered, vehicle speed can be controlled according to the actual safety situation on the road, thereby improving safety of vehicle travelling.

Further, in the example embodiment, a speed control command receiving device is installed on the vehicle. Receiving the speed limit command sent by the speed control device includes: receiving, through the speed control command receiving device, the speed limit command sent by the speed control device via a 5G cellular network. By conducting communication between the vehicle and the speed control device via the 5G network, communication delay between the vehicle and the speed control device can be reduced since the 5G network has small delay, so that the vehicle can be reminded to limit the speed in time, thereby further improving the safety of vehicle travelling.

In addition, in the exemplary embodiment, a vehicle speed limiting device is installed on the vehicle, and the vehicle speed control method further includes: if the current travelling speed of the vehicle is less than or equal to the speed limit, not activating the vehicle speed limiting device; if the current travelling speed of the vehicle is greater than the speed limit, reducing the travelling speed of the vehicle to less than the speed limit through the vehicle speed limiting device. By disposing the vehicle speed limiting device on the vehicle, the vehicle speed can be automatically reduced when the vehicle travels to an accident-prone area, thereby further improving the safety of vehicle travelling.

Further, in the exemplary embodiment, the number of times of sending the speed limit command to the vehicle is determined according to the magnitude of the accident occurrence rate in the area where the speed control device is located, for example, the greater the accident occurrence rate is, the greater the number of times of sending the speed limit command to the vehicle. The safety of vehicle travelling is further improved by reminding a driver of limiting speed several times in an accident-prone road section.

In addition, in the exemplary embodiment, the speed control device can be disposed outside the vehicle. For example, the speed control device is disposed in the area where the accident occurrence rate is greater than or equal to the preset threshold. The speed control device may also be disposed on the vehicle, for example, on a vehicle navigation system of the vehicle. If the speed control device is disposed in the area where the accident occurrence rate is greater than or equal to the preset threshold, the speed control device only needs to be installed in the accident-prone place, which can reduce the number of speed control devices installed and reduce labor costs and maintenance costs.

Figure 3:
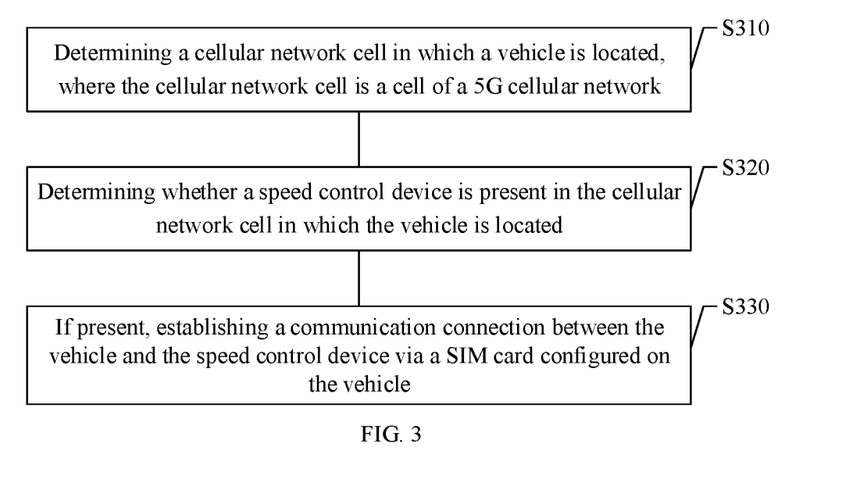
FIG. 3 is a schematic flowchart of establishing a communication connection between a vehicle and a speed control device according to some embodiments of the present disclosure.

FIG. 3 is a schematic flowchart of establishing a communication connection between a vehicle and a speed control device according to some embodiments of the present disclosure.

Referring to FIG. 3, in step S310, determining a cellular network cell in which a vehicle is located, where the cellular network cell is a cell of a 5G cellular network.

In the example embodiment, if the vehicle is handed over to the next cellular network cell while traveling, then the cellular network cell in which the vehicle is currently located is determined, and the cellular network cell is a cell of the 5G cellular network.

In step S320, determining whether a speed control device is present in the cellular network cell in which the vehicle is located.

In the exemplary embodiment, whether a speed control device is present in the cellular network cell in which the vehicle is located is detected, for example, detecting whether a scan signal sent by the speed control device can be received in the cellular network cell in which the vehicle is located. If the scan signal sent by the speed control device can be detected, then it is determined that the speed control device is present in the cellular network cell in which the vehicle is located.

In step S330, if present, establishing a communication connection between the vehicle and the speed control device via a Subscriber Identity Module (SIM) card configured on the vehicle, where the SIM card is a SIM card based on the 5G cellular network.

In the example embodiment, if a speed control device is present in the cellular network cell in which the vehicle is located, a 5G communication connection is established between the vehicle and the speed control device via the SIM card configured on the vehicle. If there are a plurality of speed control devices in the cellular network cell in which the vehicle is located, a distance between the vehicle and each speed control device is determined; a target speed control device is determined from the plurality of the speed control devices according to the distance between the vehicle and each speed control device; and a communication connection between the vehicle and the target speed control device is established. For example, current latitude and longitude of the vehicle and current latitude and longitude of each speed control device can be determined; the distance between the vehicle and each speed control devices is determined according to the current latitude and longitude of the vehicle and the current latitude and longitude of each speed control device, and a speed control device that is closest to the vehicle is determined as the target speed control device.

Further, the speed limit of each speed control device is different. For example, the speed limit of the speed control device is related to the position where the speed control device is disposed. The higher the traffic accident occurrence rate at the position where the speed control device is disposed, the smaller the speed limit of the speed control device, thereby reducing the travelling speed of the vehicle when travelling to this position and reducing the probability of occurrence of a traffic accident.

Figure 4:
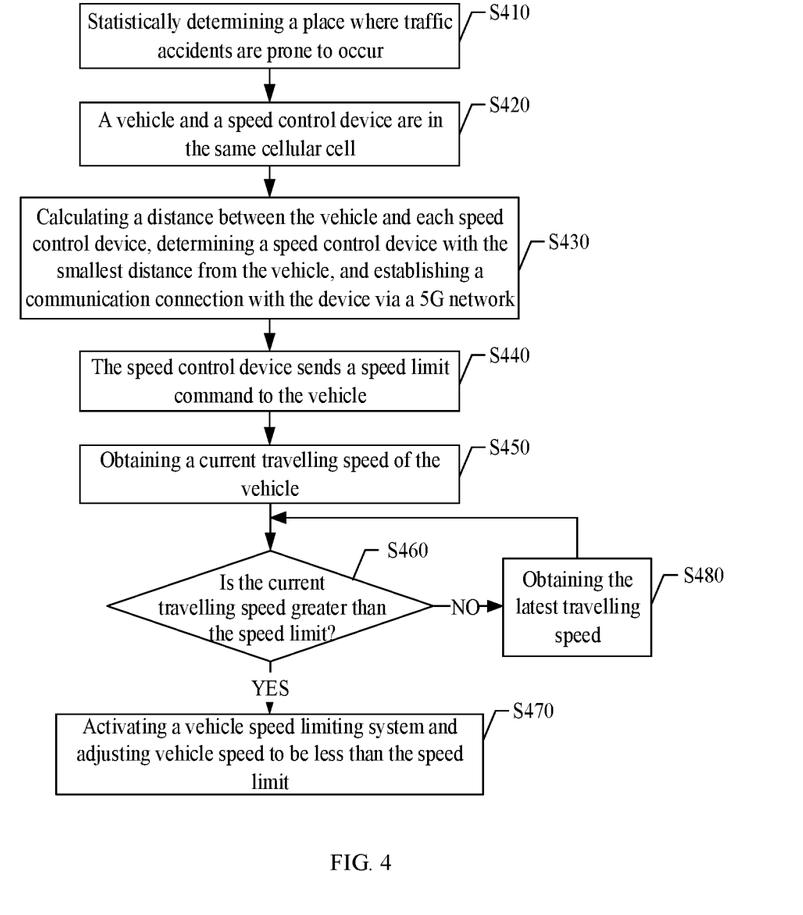
FIG. 4 is a schematic flowchart of a vehicle speed control method provided according to other embodiments of the present disclosure.

FIG. 4 is a schematic flowchart of a vehicle speed control method provided according to other embodiments of the present disclosure.

Referring to FIG. 4, in step S410, statistically determining places where traffic accidents occur, and when the accident occurrence rate at a same place is greater than or equal to a preset threshold, determining the place to be an accident-prone place.

In step S420, monitoring whether a vehicle enters a target area through the speed control device, such as monitoring whether a vehicle enters the cellular network cell in which the speed control device is located, and if a vehicle enters, then step S430 is proceeded to. That is, when the vehicle and the speed control device are in the same cellular cell, step S430 is proceeded to, and a 5G SIM card is installed at the speed control device.

In step S430, calculating a distance between the vehicle and each speed control device, determining a speed control device with the smallest distance from the vehicle, and establishing a communication connection with the speed control device via the 5G network.

In step S440, the speed control device sends a speed limit command to the vehicle. For example, a speed control command sending device is installed on the speed control device. When the vehicle and the speed control device are in the same cellular network cell, a communication connection between the speed control device and the vehicle is established. Both the speed control device and the vehicle are configured with a 5G SIM card. After the communication connection between the speed control device and the vehicle is established, the speed control device provides a real-time speed limit command to the vehicle. The speed limit command includes a speed limit, and the speed limit command is transmitted to the vehicle via the 5G network.

In step S450, after receiving the speed limit command via command receiving device on the vehicle, obtaining a current travelling speed of the vehicle, and comparing the current travelling speed of the vehicle with the speed limit.

In step S460, determining whether the current travelling speed of the vehicle is greater than the speed limit; if it is greater than the speed limit, S470 is proceeded to, and if it is less than or equal to the speed limit, S480 is proceeded to.

In step S470, activating a vehicle speed limiting system and adjusting vehicle speed to be less than the speed limit.

In step S480, obtaining the latest travelling speed of the vehicle, and then proceeding to step S460 again.

According to the technical solution in the exemplary embodiment of FIG. 4, on the one hand, a data transmission method of the 5G network is used, which makes the transmission rate faster, the transmission distance farther, and the time delay of air interfaces shorter, thereby further making the overall response time of a dynamic speed limiting system of the Vehicle to Everything (Vehicle to Everything, V2X) road shorter and enabling more timely control of the vehicle travelling speed. On the other hand, the speed control devices only need to be installed in the accident-prone places, which reduces the number of the speed control devices, and meanwhile can effectively reduce the traffic accident occurrence rate, and reduce the economic costs of road laying, labor costs and maintenance costs.

Figure 5:
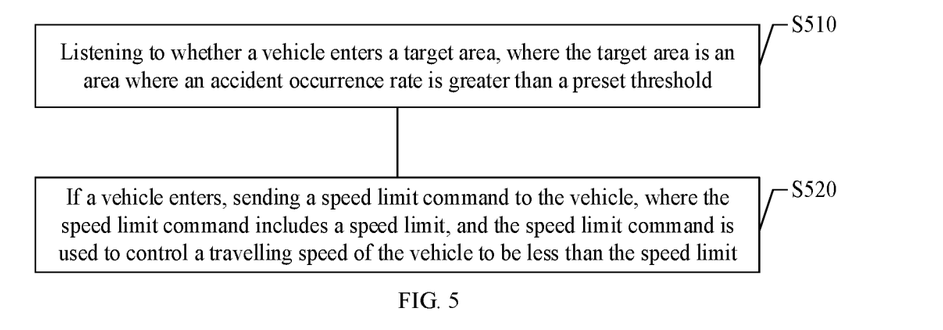
FIG. 5 is a schematic flowchart of a vehicle speed control method provided according to further embodiments of the present disclosure.

FIG. 5 is a schematic flowchart of a vehicle speed control method provided according to further embodiments of the present disclosure.

Referring to FIG. 5, in step S510, listening to whether a vehicle enters a target area, where the target area is an area where an accident occurrence rate is greater than a preset threshold.

In the exemplary embodiment, the listening of whether a vehicle enters the target area is performed through a speed control device, for example, monitoring whether a vehicle enters a cellular network cell in which the speed control device is located, the cellular network cell being a cell of a fifth-generation cellular network.

In step S520, if a vehicle enters, sending a speed limit command to the vehicle, where the speed limit command includes a speed limit, and the speed limit command is used to control a travelling speed of the vehicle to be less than the speed limit.

In the example embodiment, if a vehicle enters, a communication connection of a 5G network is established between the speed control device and the vehicle via a SIM card installed on the speed control device, where the SIM card is a SIM card based on the fifth-generation cellular network. After the communication connection is established between the speed control device and the vehicle, the speed limit command is sent to the vehicle, where the speed limit command includes the speed limit, and the speed limit command is used to control the travelling speed of the vehicle to be less than the speed limit.

It should be noted that this embodiment does not limit the communication connection mode between the vehicle and the speed control device, and accordingly, does not limit the communication connection mode of the SIM card in the vehicle. The communication connection mode may be 2G, 3G, 4G, 5G and other communication technologies.

According to the technical solution in the exemplary embodiment of FIG. 5, when the vehicle travels to an accident-prone place, i.e., an area where the accident occurrence rate is greater than or equal to the preset threshold, the speed limit command is sent to the vehicle, and the travelling speed of the vehicle is reduced to below the speed limit according to the speed limit command. Since actual safety situation of a road is fully considered, vehicle speed can be controlled according to the actual safety situation on the road, thereby improving safety of vehicle travelling.

Figure 6:
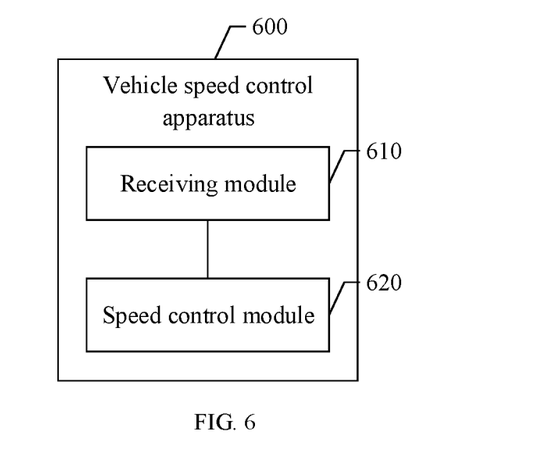
FIG. 6 is a schematic block diagram of a vehicle speed control apparatus provided according to some embodiments of the present disclosure.

FIG. 6 is a schematic block diagram of a vehicle speed control apparatus provided according to some embodiments of the present disclosure. Referring to FIG.

6, the speed control apparatus 600 is applied to a vehicle, and the speed control apparatus 600 includes: a receiving module 610, configured to receive a speed limit command sent by a speed control device, where the speed limit command includes a speed limit, and the speed limit command is generated by the speed control device when it is determined that a position of the vehicle is in an area where an accident occurrence rate is greater than or equal to a preset threshold; and a speed control module 620, configured to reduce a travelling speed of the vehicle to less than the speed limit in response to the speed limit command.

In some embodiments of the present disclosure, based on the above solution, the speed control device is disposed in the area where the accident occurrence rate is greater than or equal to the preset threshold.

Figure 7:
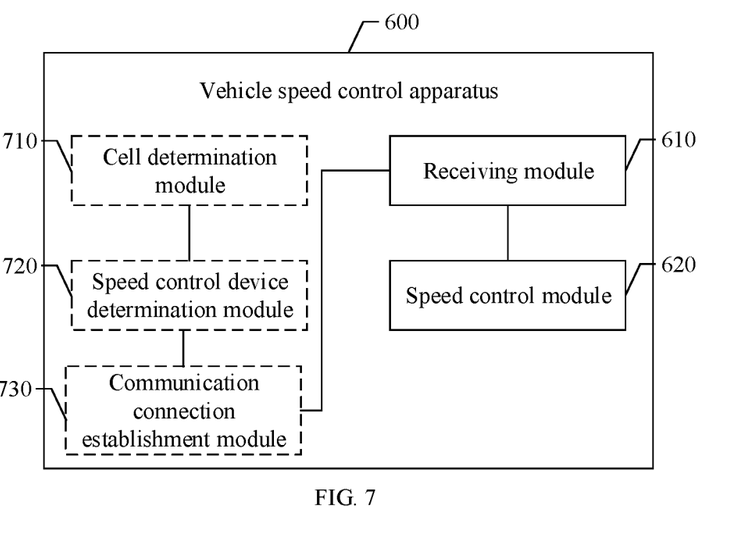
FIG. 7 is a schematic block diagram of a vehicle speed control apparatus provided according to other embodiments of the present disclosure.

In some embodiments of the present disclosure, based on the above solutions and with reference to FIG. 7, the vehicle speed control device 600 further includes: a cell determination module 710, configured to determine a cellular network cell in which the vehicle is located, the cellular network cell being a fifth-generation cellular network cell; a speed control device determination module 720, configured to determine whether a speed control device is present in the cellular network cell; and a communication connection establishment module 730, configured to: if present, establish a communication connection between the vehicle and the speed control device through a SIM card configured on the vehicle, the SIM card being a SIM card based on a fifth-generation cellular network.

Figure 8:
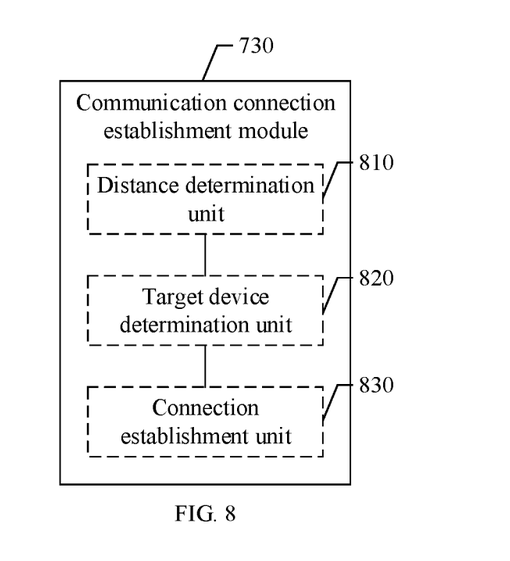
FIG. 8 is a schematic block diagram of a communication connection establishment module provided according to some embodiments of the present disclosure.

In some embodiments of the present disclosure, based on the above solutions and with reference to FIG. 8, the communication connection establishment module 730 includes: a distance determination unit 810, configured to: if there are a plurality of speed control devices in the cellular network cell, determine a distance between the vehicle and each of the speed control devices; a target device determination unit 820, configured to determine a target speed control device from the plurality of the speed control devices according to the distance between the vehicle and each of the speed control devices; and a connection establishment unit 830, configured to establish a communication connection between the vehicle and the target speed control device.

In some embodiments of the present disclosure, based on the above solutions, the distance determination unit 810 is configured to: determine current latitude and longitude of the vehicle and current latitude and longitude of each of the speed control devices; and determine a distance between the vehicle and each of the speed control devices according to the current latitude and longitude of the vehicle and the current latitude and longitude of each of the speed control devices.

In some embodiments of the present disclosure, based on the above solutions, a speed control command receiving device is installed on the vehicle, and the receiving module 610 is configured to receive, through the speed control command receiving device, the speed limit command sent by the speed control device via the fifth-generation cellular network.

In some embodiments of the present disclosure, based on the above solutions, a vehicle speed limiting device is installed on the vehicle, and the vehicle speed limiting device is configured to: if a current travelling speed is less than or equal to the speed limit, not activate the vehicle speed limiting device. That the speed control module 620 is configured to reduce the travelling speed of the vehicle to less than the speed limit includes that the speed control module 620 is configured to reduce the travelling speed of the vehicle to less than the speed limit through the vehicle speed limiting device.

Figure 9:
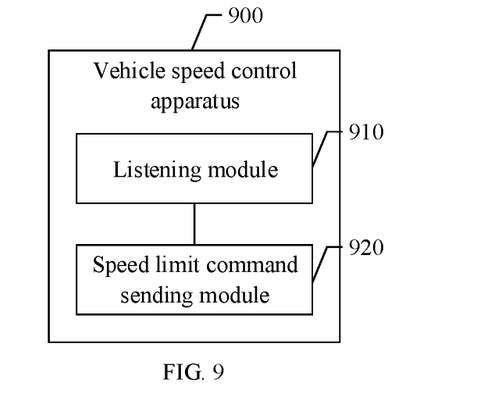
FIG. 9 is a schematic block diagram of a vehicle speed control apparatus provided according to some embodiments of the present disclosure.

FIG. 9 is a schematic block diagram of a vehicle speed control apparatus provided according to some embodiments of the present disclosure. Referring to FIG. 9, the vehicle speed control apparatus 900 is applied to a speed control device, and the vehicle speed control apparatus 900 includes: a listening module 910, configured to listen to whether a vehicle enters a target area, where the target area is an area where an accident occurrence rate is greater than a preset threshold; and a speed limit command sending module 920, configured to: if a vehicle enters, send a speed limit command to the vehicle, where the speed limit command includes a speed limit, and the speed limit command is used to control a travelling speed of the vehicle to less than the speed limit.

Figure 10:
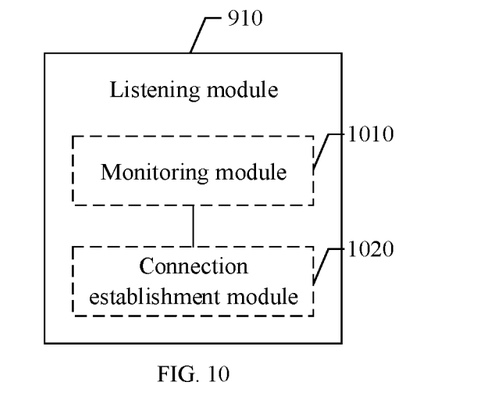
FIG. 10 is a schematic block diagram of a listening module provided according to some embodiments of the present disclosure.

In some embodiments of the present disclosure, based on the above solution and with reference to FIG. 10, the listening module 910 includes: a monitoring module 1010, configured to monitor whether a vehicle enters a cellular network cell in which the speed control device is located, the cellular network cell being a cell of a fifth-generation cellular network; and a connection establishment module 1020, configured to: if a vehicle enters, establish a communication connection between the speed control device and the vehicle through a SIM card installed on the speed control device, where the SIM card is a SIM card based on the fifth-generation cellular network.

The vehicle speed control apparatus provided in the embodiments of the present application is capable of implementing each of the processes in the above method embodiments and achieving the same functions and effects, which will not be repeated here.

Figure 11:
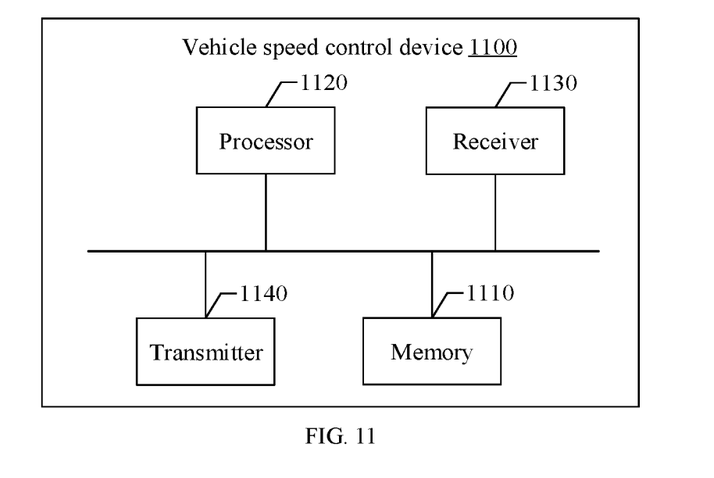
FIG. 11 is a schematic block diagram of an embodiment of a vehicle speed control device provided according to some embodiments of the present disclosure.

FIG. 11 illustrates a schematic structural diagram of a vehicle speed control device provided by some embodiments of the present disclosure. As shown in FIG. 11, the vehicle speed control device 1100 provided by this embodiment can include: a memory 1110, a processor 1120, a receiver 1130 and a transmitter 1140.

In an implementation, the vehicle speed control device 1110 may also include a bus. The bus is used to implement connections between various components.

The memory 1110 is configured to store a computer program and data, and the processor 1120 calls the computer program stored in the memory to execute the technical solution of the vehicle speed control method provided by any of the above method embodiments.

The memory 1110 and the processor 1120 are electrically connected, directly or indirectly, to each other for data transmission or interaction. For example, the components may be electrically connected to each other via one or more communication buses or signal lines, for example, may be connected via the bus. The memory 1110 stores computer execution instructions for implementing a data access control method, including at least one software function module that may be stored in the memory 1110 in the form of software or firmware, and the processor 1120 executes various functional applications as well as vehicle speed control by running the computer program and the module stored in the memory 1110.

The memory 1110 may be, but is not limited to, a Random Access Memory (Random Access Memory, RAM), a Read-Only Memory (Read-Only Memory, ROM), a Programmable Read-Only Memory (Programmable Read-Only Memory, PROM), an Erasable Programmable Read-Only Memory (Erasable Programmable Read-Only Memory, EPROM), an Electric Erasable Programmable Read-Only Memory (Electric Erasable Programmable Read-Only Memory, EEPROM), etc. The memory 1110 is used to store the program, and the processor 1120 executes the program after receiving the execution instructions. Further, the software program and the module within the memory 110 described above may also include an operating system, which may include various software components and/or drivers for managing system tasks (e.g., memory management, storage device control, power management, etc.) and may communicate with various hardware or software components, thereby providing an operating environment for other software components.

The processor 1120 may be an integrated circuit chip with signal processing capability. The processor described above may be a general-purpose processor, including a Central Processing Unit (Central Processing Unit, CPU), a Network Processor (Network Processor, NP), etc., which can implement or execute the methods, steps and logical block diagrams disclosed in the embodiments of the present disclosure can be implemented or executed. The general-purpose processor may be a microprocessor or the processor may also be any conventional processor, etc. It can be understood that the structure shown in FIG. 11 is only schematic; more or fewer components than those shown in FIG. 11 may also be included, or there may be a different configuration from the one shown in FIG. 11. The components shown in FIG. 11 may be implemented in hardware and/or software.

An embodiment of the present disclosure also provides a computer-readable storage medium having a computer program stored thereon. The computer program can implement the vehicle speed control method provided by any of the method embodiments described above when executed by a processor.

The computer-readable storage medium in this embodiment may be any available medium to which the computer has access, or a data storage device including a server integrated by one or more available media, a data center, etc. The available medium may be a magnetic medium (e.g., a floppy disk, a hard disk, a magnetic tape), an optical medium (e.g., a DVD), or a semiconductor medium (e.g., an SSD), etc.

It can be understood by those of ordinary skill in the art that all or some of the steps for implementing each of the method embodiments described above may be accomplished by hardware related to program instructions. The aforementioned program may be stored in a computer-readable storage medium. The program, when executed, performs the steps including the method embodiments described above. The above storage medium includes: a ROM, a RAM, a disk, a CD-ROM, or various other media that can store program code.

Finally, it should be noted that the above embodiments are only used to explain the technical solutions of the present disclosure, not to limit it. Although the present disclosure has been described in detail with reference to the above embodiments, those skilled in the art should understand that the technical solutions recorded in the above embodiments can still be modified, or some or all of the technical features thereof can be replaced equivalently. These modifications or replacements do not make the essence of the corresponding technical solutions depart from the scope of the technical solutions of the embodiments of the present disclosure.

What is claimed is:

1. A vehicle speed control method, applied to a vehicle, wherein the method comprises:
    receiving a speed limit command sent by a speed control device, wherein the speed limit command comprises a speed limit, and the speed limit command is generated by the speed control device when it is determined that a position of the vehicle is in an area where an accident occurrence rate is greater than or equal to a preset threshold;
    reducing a travelling speed of the vehicle to less than the speed limit in response to the speed limit command;
    wherein the method further comprises:
    determining a cellular network cell in which the vehicle is located;
    determining whether the speed control device is present in the cellular network cell;
    upon determining that the speed control device is present, establishing a communication connection between the vehicle and the speed control device through a Subscriber Identity Module (SIM) card configured on the vehicle, wherein the SIM card is a cellular network-based SIM card.

2. The method according to claim 1, wherein the speed control device is disposed in the area where the accident occurrence rate is greater than or equal to the preset threshold.

3. The method according to claim 1, wherein establishing the communication connection between the vehicle and the speed control device comprises:
    upon determining that there are a plurality of speed control devices in the cellular network cell, determining a distance between the vehicle and each of the speed control devices;
    determining a target speed control device from the plurality of the speed control devices according to the distance between the vehicle and each of the speed control devices;
    establishing a communication connection between the vehicle and the target speed control device.

4. The method according to claim 3, wherein determining the distance between the vehicle and each of the speed control devices comprises:
    determining current latitude and longitude of the vehicle and current latitude and longitude of each of the speed control devices;
    determining the distance between the vehicle and each of the speed control devices according to the current latitude and longitude of the vehicle and the current latitude and longitude of each of the speed control devices.

5. The method according to claim 1, wherein a speed control command receiving device is installed on the vehicle, and receiving the speed limit command sent by the speed control device comprises:
    receiving, through the speed control command receiving device, the speed limit command sent by the speed control device via a cellular network.

6. The method according to claim 1, wherein a vehicle speed limiting device is installed on the vehicle, and the method further comprises:
    upon determining that a current travelling speed is less than or equal to the speed limit, not activating the vehicle speed limiting device;
    wherein reducing the travelling speed of the vehicle to less than the speed limit comprises:
    reducing the travelling speed of the vehicle to less than the speed limit through the vehicle speed limiting device.

7. A non-transitory computer-readable storage medium, comprising a computer program; wherein the computer program, when executed by a processor, is used to execute the vehicle speed control method according to claim 1.

8. A vehicle speed control method, applied to a speed control device, wherein the method comprises:
    listening to whether a vehicle enters a target area, wherein the target area is an area where an accident occurrence rate is greater than a preset threshold;
    upon determining that a vehicle enters, sending a speed limit command to the vehicle, wherein the speed limit command comprises a speed limit, and the speed limit command is used to control a travelling speed of the vehicle to be less than the speed limit;
    wherein listening to whether a vehicle enters the target area comprises:
    monitoring whether a vehicle enters a cellular network cell in which the speed control device is located;
    upon determining that a vehicle enters, establishing a communication connection between the speed control device and the vehicle through a Subscriber Identity Module (SIM) card installed on the speed control device, wherein the SIM card is a cellular network-based SIM card.

9. A vehicle speed control apparatus, applied to a speed control device, wherein the apparatus comprises a processor and a memory; wherein the memory is configured to store a computer program and data, and the processor is configured to call the computer program stored in the memory to execute the vehicle speed control method according to claim 8.

10. A non-transitory computer-readable storage medium, comprising a computer program; wherein the computer program, when executed by a processor, is used to execute the vehicle speed control method according to claim 8.

11. A vehicle speed control apparatus, applied to a vehicle, wherein the apparatus comprises a processor and a memory; wherein the memory is configured to store a computer program and data, and the processor is configured to call the computer program stored in the memory to:
- receive a speed limit command sent by a speed control device, wherein the speed limit command comprises a speed limit, and the speed limit command is generated by the speed control device when it is determined that a position of the vehicle is in an area where an accident occurrence rate is greater than or equal to a preset threshold;
- reduce a travelling speed of the vehicle to less than the speed limit in response to the speed limit command;
- wherein the processor is further configured to:
- determine a cellular network cell in which the vehicle is located;
- determine whether the speed control device is present in the cellular network cell;
- upon determining that the speed control device is present, establish a communication connection between the vehicle and the speed control device through a Subscriber Identity Module (SIM) card configured on the vehicle, wherein the SIM card is a cellular network-based SIM card.

12. The apparatus according to claim 11, wherein the speed control device is disposed in the area where the accident occurrence rate is greater than or equal to the preset threshold.

13. The apparatus according to claim 11, wherein the processor is further configured to:
- upon determining that there are a plurality of speed control devices in the cellular network cell, determine a distance between the vehicle and each of the speed control devices;
- determine a target speed control device from the plurality of the speed control devices according to the distance between the vehicle and each of the speed control devices;
- establish a communication connection between the vehicle and the target speed control device.

14. The apparatus according to claim 13, wherein the processor is further configured to:
- determine current latitude and longitude of the vehicle and current latitude and longitude of each of the speed control devices;
- determine the distance between the vehicle and each of the speed control devices according to the current latitude and longitude of the vehicle and the current latitude and longitude of each of the speed control devices.

15. The apparatus according to claim 11, wherein a speed control command receiving device is installed on the vehicle, and the processor is further configured to:
- receive, through the speed control command receiving device, the speed limit command sent by the speed control device via a cellular network.

16. The apparatus according to claim 11, wherein a vehicle speed limiting device is installed on the vehicle, and the processor is further configured to:
- upon determining that a current travelling speed is less than or equal to the speed limit, not activate the vehicle speed limiting device;
- wherein that the processor is configured to reduce the travelling speed of the vehicle to less than the speed limit comprises that: the processor is configured to reduce the travelling speed of the vehicle to less than the speed limit through the vehicle speed limiting device.

* * * * *